United States Patent
Ford et al.

[11] Patent Number: 5,902,457
[45] Date of Patent: May 11, 1999

[54] SPRAY GENERATORS

[75] Inventors: Lionel Houston Ford; John William Stairmand, both of Blackpool, United Kingdom

[73] Assignee: AEA Technology PLC, Didcot, United Kingdom

[21] Appl. No.: 08/291,902

[22] Filed: Aug. 18, 1994

[30] Foreign Application Priority Data

Sep. 11, 1993 [GB] United Kingdom ............... 93 18867

[51] Int. Cl.⁶ .................. B01D 1/16; B05B 7/10
[52] U.S. Cl. .................. 202/236; 159/48.1; 203/90; 261/115; 239/405
[58] Field of Search .................. 159/4.04, 4.08, 159/48.1, DIG. 40; 202/236; 203/90; 261/115; 239/405, 589.1; 55/238; 137/835

[56] References Cited

U.S. PATENT DOCUMENTS

| | | | |
|---|---|---|---|
| 2,542,761 | 2/1951 | Fogler | 239/421 |
| 4,002,293 | 1/1977 | Simmons | 239/11 |
| 4,943,007 | 7/1990 | Bowe | 239/405 |
| 5,053,142 | 10/1991 | Sorensen et al. | 210/742 |

FOREIGN PATENT DOCUMENTS

| | | |
|---|---|---|
| 74301 | 9/1892 | Germany. |
| 621785 | 4/1949 | United Kingdom. |
| 949954 | 2/1964 | United Kingdom. |
| 1253221 | 11/1971 | United Kingdom. |
| 1476265 | 6/1977 | United Kingdom. |

*Primary Examiner*—Krisanne Thornton
*Assistant Examiner*—E. Leigh McKane
*Attorney, Agent, or Firm*—William H. Holt; William R. Hinds

[57] ABSTRACT

An apparatus for generating a liquid spray from two jets of fluid which issue from a pair of opposing nozzles and interact, wherein the fluid is supplied to the nozzles under fully turbulent conditions such that random variations in the momentum of the fluid as it leaves the nozzles occur which results in random variations in the orientation of the resultant spray of liquid drops.

**11 Cla

SPRAY GENERATORS

The present invention relates to spray generators of the type in which two opposed jets of liquid impinge on each other and are disrupted to form a curtain of drops.

In our earlier patent application, EP 0 331 343, (U.S. Pat. No. 4,943,007) there is disclosed a spray generator in which two opposed jets of liquid impinge upon each other and are disrupted to form a curtain of liquid drops. Substantially uniform cyclic disturbances are imposed upon the fluid flows at the nozzles, and these cause the spray of droplets to oscillate regularly through an arc. A similar arrangement is disclosed in GB specification 949,954.

In both the above spray generators there is included a phased valving device which modulates the flow to one or other of the fluid flow lines leading to the nozzles.

Spray generators such as those described in either of the above specifications are satisfactory in operation, but the presence of the phased valving device can give an opportunity for failure, and is a factor in the overall cost of the devices.

It is an object of the present invention to provide an opposed jet spray generator which is simpler than those available hitherto.

According to the present invention there is provided an apparatus for generating a liquid spray, comprising an opposed pair of nozzles, fluid flow lines for feeding fluid to the nozzles such that oppositely directed fluid jets emerging from the nozzles impinge upon one another, for generating a spray of liquid in the directions extending transversely of the jets, and means for supplying fluid to the fluid flow lines under conditions in which fluid flow is at least partially turbulent.

The invention arises from the realization that the imposition of variations in the pressure of fluid flowing to each of the nozzles by external valves is not necessary if the fluid flow can be made to be inherently unstable, either by using a pump which produces an irregular output flow or by operating the device in a region where the fluid flowing in the fluid flow lines does so in an at least partially turbulent fashion, in which case inherently there will be random variations in the fluid flowing to the nozzles, so causing the sheet of droplets arising from the interaction of the two jets of fluid from the nozzles to move irregularly through an arc determined by the magnitude of the variations in the momentum of the fluid flowing to the nozzles.

The irregular variations in the flow of the fluid may be derived from irregularities in the flow of the fluid from a pump associated with the spray generator, or arise by causing the flow in the fluid flow lines leading to the nozzles to be at least partially turbulent, for example by ensuring that the value of Reynold's Number for the fluid flowing in the fluid flow lines has a value greater than about 12000.

The invention will now be described, by way of example, with reference to the accompanying drawings, which FIG. 1 is a schematic representation of a gas/liquid contactor embodying the invention.

Figure 1:
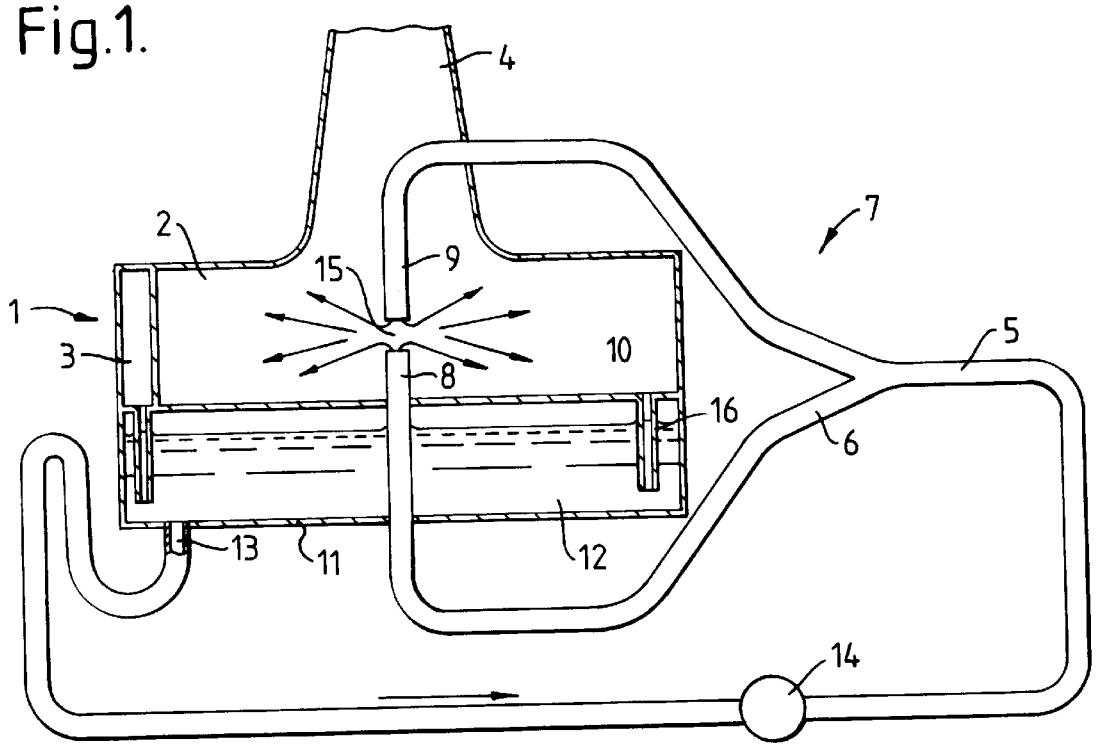

Referring to FIG. 1, there is shown a gas/liquid contactor 1 which consists of a cylindrical vortex chamber 2 which has a tangential inlet port 3 for a gaseous phase to be treated in the gas/liquid contactor 1. The vortex chamber 2 has an axial outlet 4 for treated gaseous phase. A liquid phase feed pipe 5 divides into two branches 6 and 7 which enter into the vortex chamber 2 and terminate in two axial opposed nozzles 8 and 9, respectively. A baffle 10 extends across the lower part of the vortex chamber 2 and the portion of the vortex chamber below the baffle 10 forms a sump 11 for the liquid phase 12 which is withdrawn through an outlet 13 and recirculated to the vortex chamber 2 by a pump 14.

The pump 14 can be of any convenient type, but it needs to have a capacity such that the fluid flowing in the branches 6 and 7 of the feed pipe 5 has a Reynold's number greater than 12000 so that its flow is at least partially turbulent so causing random variations in the pressures in the feed pipes 6 and 7 and hence the momentum of the fluid as it leaves the nozzles 8 and 9.

These random variations in the momentum of the fluid issuing from the nozzles 8 and 9 cause the impacting jets of fluid issuing from the nozzles 8 and 9 to form into a sheet 15 of radially moving droplets which sweeps randomly through an arc which is determined by the size of the random variations in the momentum of the fluid issuing from the nozzles 8 and 9.

As described in Specification EP 0 331 343 A, gas entering the vortex chamber 2 via the inlet ports is washed by the sheet 15 of droplets. Droplets are sprayed through the gas vortex to the outer wall of the vortex chamber 2 and drain into the sump 11 through the tubes 16 in the baffle 10. The washed gas, rendered substantially free of liquid leaves the vortex chamber 2 via the axial outlet port 4.

Figure 2:
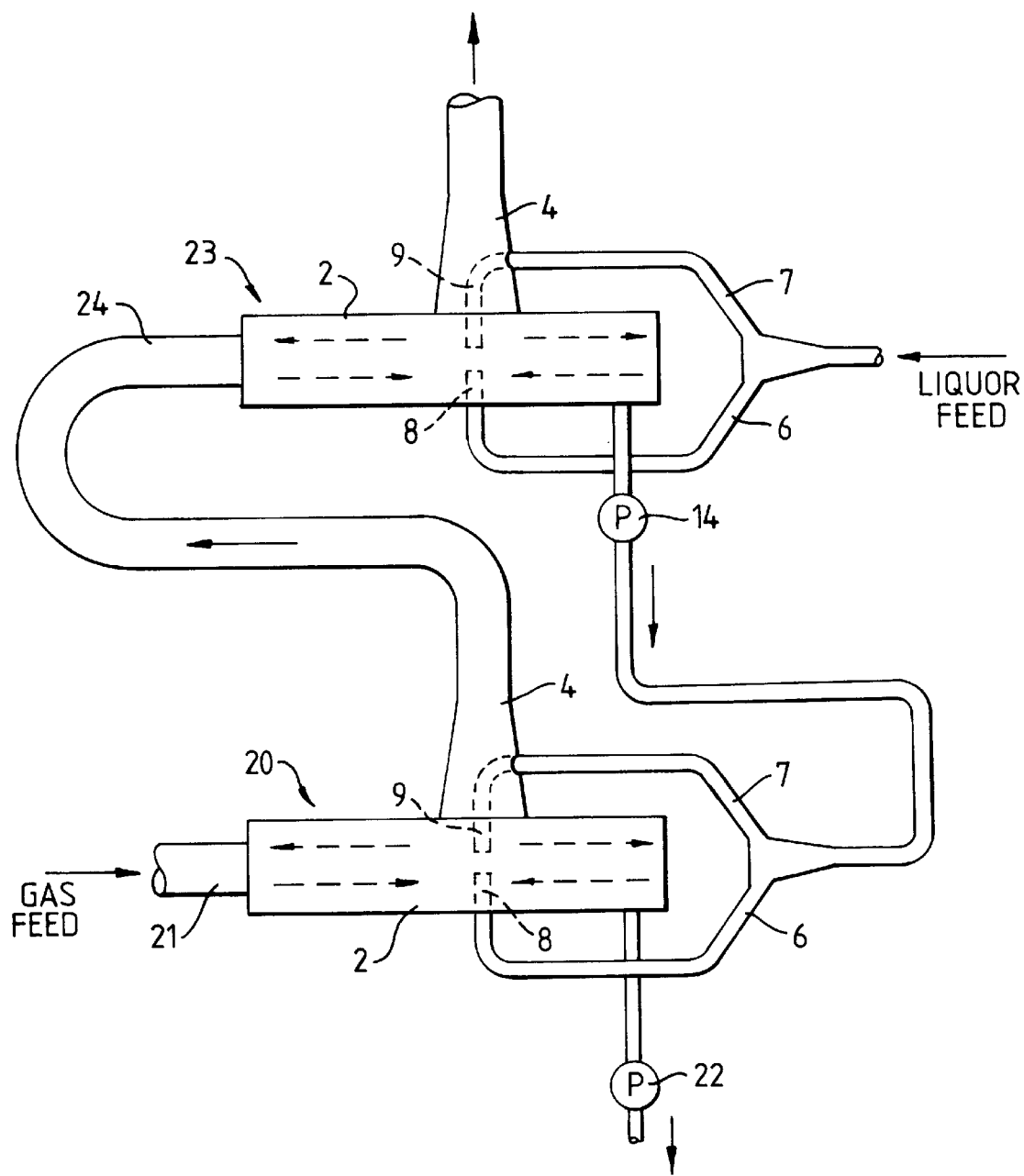
FIG. 2 is a representation of two stages of a distillation column embodying the invention.

FIG. 2 shows how a plurality of gas/liquid contactors as described with reference to FIG. 1 can be connected in series to form a distillation column. Those ports which are the same as in the gas/liquid contactor already described have the same reference numerals.

Feed gaseous phase enters a first stage gas/liquid contactor 20 via a pipe 21. Inside the first stage gas/liquid contactor 20 it meets, and is washed by, a sheet of liquid droplets issuing from nozzles 8 and 9, as before. The liquid from which the droplets are formed is pumped from the sump of a second stage gas/liquid contactor 23 and is supplied to the feed pipes 6 and 7 of the first stage gas/liquid contactor 20 at a pressure such that its flow is at least partially turbulent so as to provide a randomly oscillating sheet of droplets in the manner already described. Liquid draining from the first stage gas/liquid contactor 20 is pumped to a boiler (not shown) by a pump 22 and vapour from the boiler is returned to the feed pipe 21 to the first stage gas/liquid contactor 20. The output vapour from the first stage gas/liquid contactor 20 is fed to the inlet ports of a second stage gas/liquid contactor 23 via an inlet pipe 24. Feed liquor, from a source, not shown, is pumped to nozzles 8 and 9 in the gas/liquid contactor 23 at a pressure such that its flow is at least partially turbulent so that, in the manner already described, a randomly oscillating sheet of droplets is formed in the vortex chamber 2 of the second stage gas/liquid contactor 23. Vapour leaving the second stage gas/liquid contactor 23 through its axial outlet can be either drawn off and condensed, or supplied to a further stage, as required.

Figure 3:
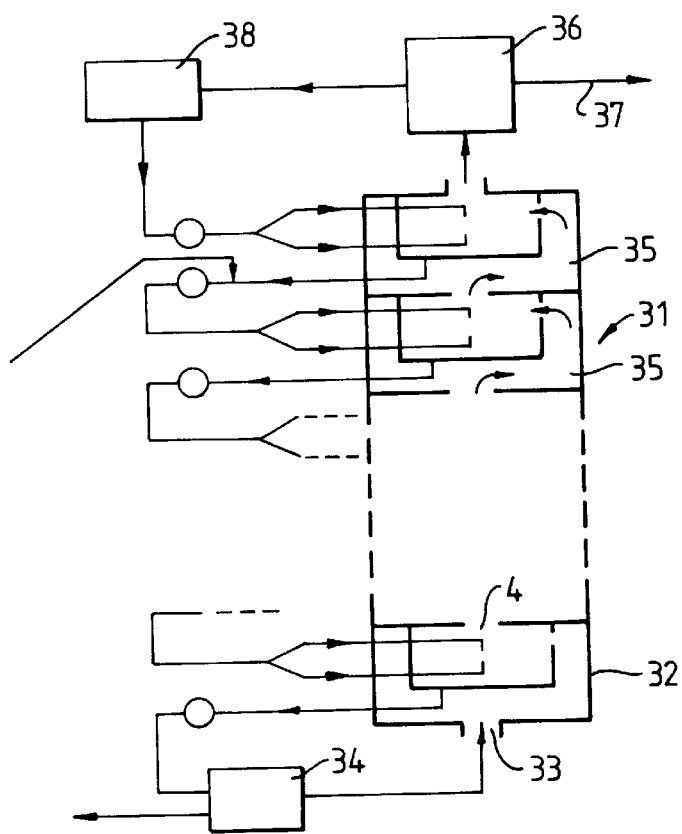
FIG. 3 is a diagrammatic representation of a multi-stage distillation column embodying the invention.

FIG. 3 shows schematically a form of multi-stage distillation column 31 in which the vortex chambers 2 of each stage are contained in an outer vessel 32 which has an inlet port 33 in its base for vapour to be distilled from a boiler 34. The annular passages 35 between the outlet 4 from each stage of the distillation column and the tangential inlet ports, which are not shown, of each succeeding stage of the distillation column 31 act as radial diffusers. The output from the final stage of the distillation column 31 is supplied to a condenser 36 from which purified gas or liquid is withdrawn via an outlet pipe 37. Other liquid from the condenser 36 is supplied to a feed vessel 38 from which it is pumped, under conditions such as to provide a randomly oscillating sheet of drops in the last stage of the distillation column 31. As in the arrangement described with relation to FIG. 2 liquid from the sump of a later stage in the distillation column 31 is used to provide the liquid input to the preceding stage. In the case of the first stage, however, liquid drained from its sump is supplied to the boiler 34 and then is added to that drained from the last stage of the distillation column 31.

Figure 4:
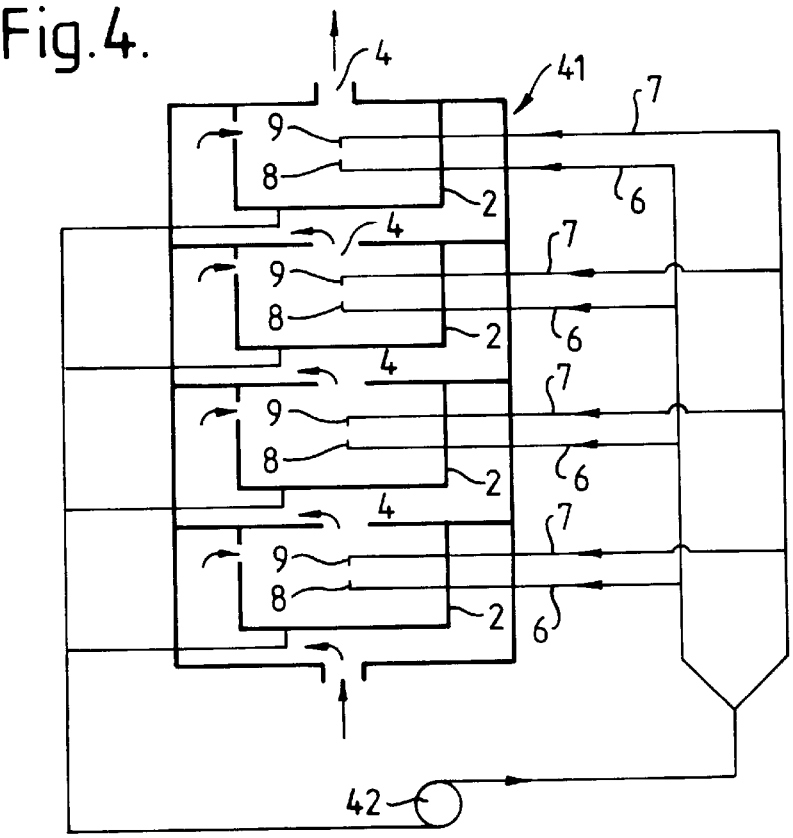
FIG. 4 is a diagrammatic representation of another multi-stage distillation column embodying the invention.

FIG. 4 shows, even more schematically another form of multi-stage gas scrubbing column 41 in which liquid from the sump of the vortex chamber 2 of each stage of the column 41 is circulated by a single pump 42 to the jet-forming nozzles 8 and 9 of each stage of the column 41.

Figure 5:
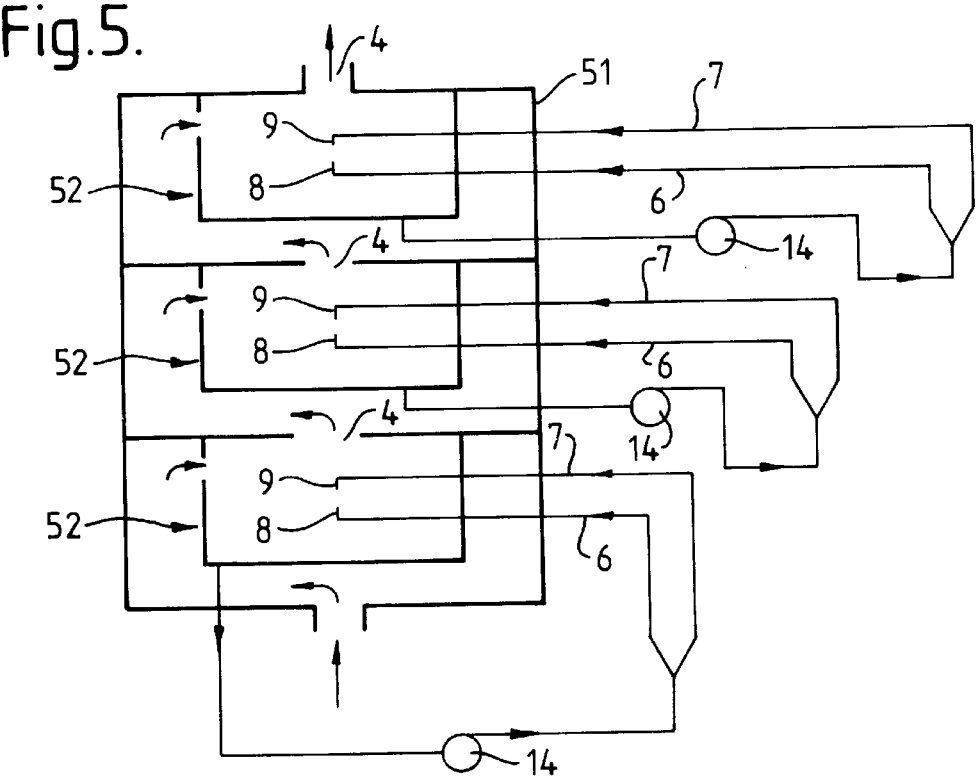
FIG. 5 is a diagrammatic representation of a third form of multi-stage distillation column embodying the invention.

FIG. 5 shows another multi-stage distillation or gas scrubbing column 51 in which the liquid circuit of each stage 52 of the column is entirely independent of that of any other stage 52 of the column 51.

Figure 6:
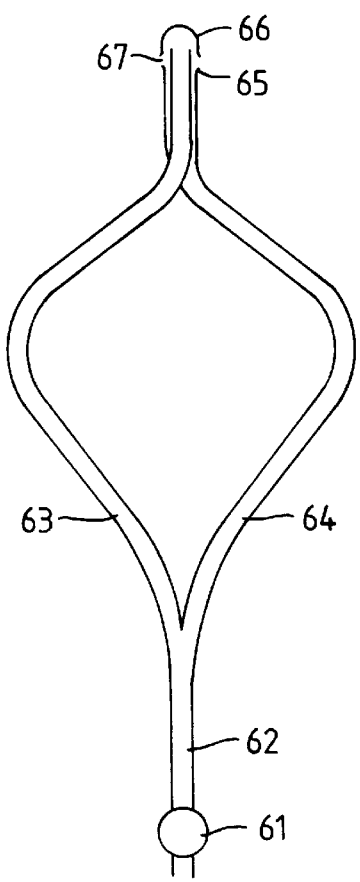
FIG. 6 is a representation of another embodiment of the invention.

FIG. 6 shows an annular nozzle arrangement which has applications as a sprayer for an oil burning furnace or as a water spray for fire fighting purposes. Referring to FIG. 6, a pump 61 supplies fluid under turbulent flow conditions to a tube 62 which divides and then comes together as two concentric, but not communicating, tubes 63 and 64. The inner tube 63 projects beyond the end 65 of the outer tube 64 and its end is covered with a flow-reversing cap 66. Thus the opposed annular jets of fluid impinge in the annular region 67 between the upper end 65 of the tube 64 and the lower edge of the flow-reversing cap 66. As before, a sheet of droplets is formed which oscillates with an arc determined by the random variations in the momentum of the jets of liquid emerging from the upper end 65 of the tube 64 and the lower edge of the cap 66 due to the turbulent flow conditions in the tubes 63 and 64.

Figure 7:
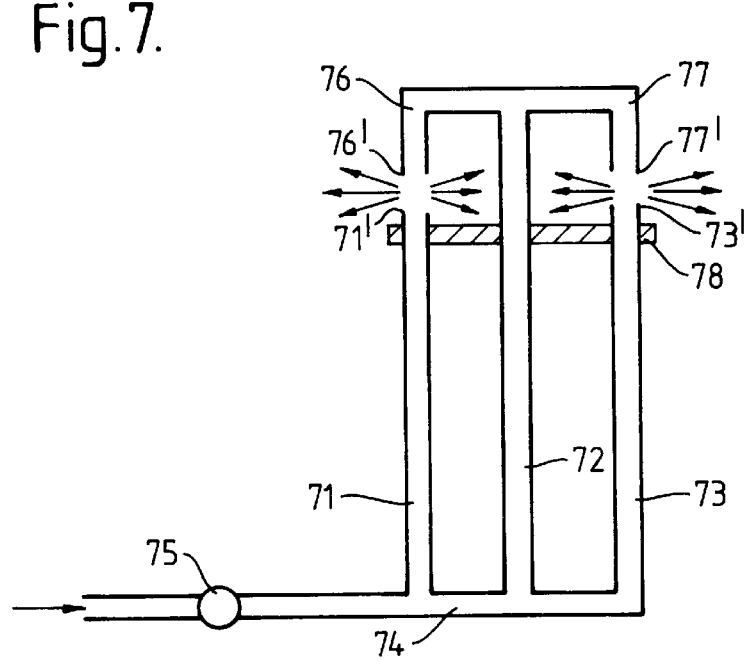
FIG. 7 is a representation of yet another embodiment of the invention.

FIG. 7 shows another form of opposed nozzle spray head which is considerably easier to manufacture than that shown in FIG. 6. Referring to FIG. 7, three pipes 71, 72 and 73 respectively, rise from a common manifold 74 to which a fluid to be sprayed is supplied by a high-pressure pump 75. The central pipe 72, projects beyond the ends 71' and 73', respectively, of the pipes 71 and 73 and branches to form a T-shape with two short end pipes 76 and 77 which are of the same diameter as the pipes 71 and 73 and terminate opposite the ends 71' and 73', respectively, of the pipes 71 and 73 and the same distance from them. The alignment between the ends 71', 73' of the pipes 71 and 73 and the ends 76' and 77', respectively of the pipes 76 and 77 is maintained by means of a block of suitable material 78. Thus there is provided a pair of opposed nozzles each of which produces a circular spray of droplets, 79.

As before the pump 75 is such as to produce a flow of liquid under conditions such that Reynold's number for the fluid just before it issues from the pipes 71, 73, 76 and 77 is greater than 12,000. The resultant random variations in the flow conditions causes the two sheets of spray 79 to oscillate in a random way, as before.

In practice, to ensure the alignment between the ends 71', 73', 76' and 77' of the pipes respective pipes 71, 72, 76 and 77, the T-piece can be fabricated from a solid block which includes suitable drillings with the same centres as those in the alignment block 78 and into the central one of which the pipe 72 fits and into the outer ones of which are inserted short stubs of the same internal diameter as the pipes 71 and 73.

Also, as with the previously described embodiments, the nozzle system can be positioned within a vortex chamber to provide a gas-liquid contactor.

Figure 8:
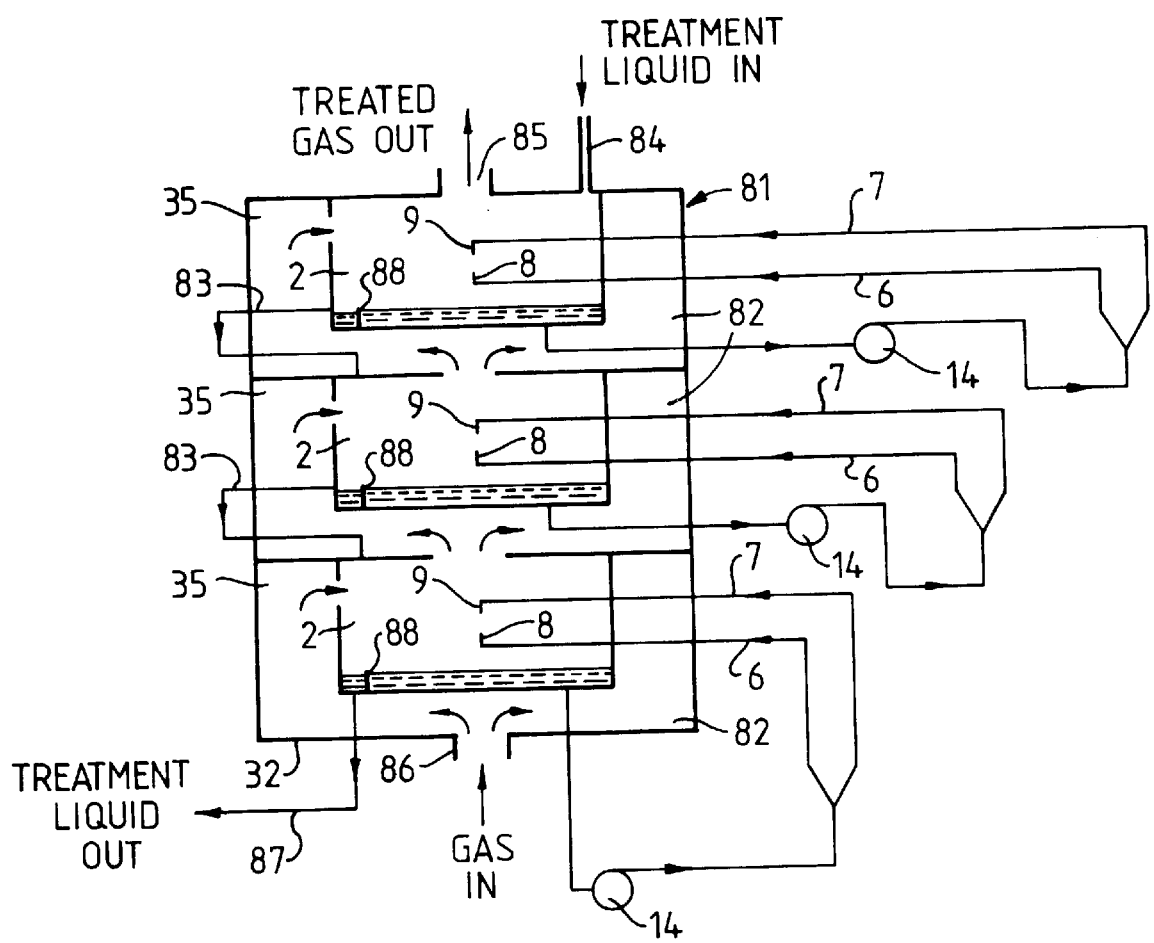
FIG. 8 is a representation of another embodiment of the invention.

Referring to FIG. 8 there is shown, schematically, another form of multi-stage gas treatment column, 81. The apparatus is somewhat similar to that described with reference to FIG. 3 and corresponding components bear corresponding reference numerals. In this embodiment of the invention, the sump 12 of the vortex chamber 2 of each stage 82 of the column 81 has an outlet 83 which connects with the upper part of the vortex chamber 2 of the preceding stage 82 of the column 81. The vortex chamber 2 of the last stage 82 of the column 81 has an inlet 84 for a treatment liquid and an axial outlet 85 for a gas which has been subjected to treatment by the treatment liquid. The vortex chamber 2 of the first stage 82 of the column 81, on the other hand, has an axial inlet 86 for the gas to be treated within the column 81 and an outlet 87 for the treatment liquid. In the sump 12 of each vortex chamber 2 there is a weir 88 which controls the level of treatment liquid in the sump 12. Thus, in use, treatment liquid passes through the column 81 countercurrent to the flow of the gaseous medium to be treated within the column 81. The treatment liquid is circulated continuously in each vortex chamber 2 of the column 81 by means of an associated pump 14 which draws liquid from the sump 12 of the vortex chamber 2 and passes it through pipes 6 and 7 to nozzles 8 and 9, where it forms a spray of drops as before. Again, each pump 14 is such that the treatment liquid is circulated through its associated pipes 6 and 7 and nozzles 8 and 9 under conditions such that Reynold's number exceeds 12,000 and the fully turbulent flow causes random variations in the momentum of the flowing liquid and hence random changes in the orientation of the sheet of droplets formed in each vortex chamber 2 of the column 81.

We claim:

1. An apparatus for generating a liquid spray, said apparatus comprising an opposed pair of nozzles, fluid flow lines for feeding fluid to said nozzles such that oppositely directed fluid jets emerging from said nozzles impinge upon one another, for generating a spray of liquid in the directions extending transversely of said jets, and means for supplying fluid to said fluid flow lines under conditions in which fluid flow is at least partially turbulent.

2. An apparatus according to claim 1 wherein said opposed pair of nozzles are substantially diametrically opposed.

3. An apparatus according to claim 1 wherein said means for supplying fluid to said nozzles comprises a pump adapted to ensure that a Reynold's Number for the conditions of flow of the fluid to the nozzles is greater than 12,000.

4. An apparatus according to claim 1 wherein said opposed nozzles are positioned so as to discharge the fluid axially in a cylindrical vortex chamber having at least one tangential inlet port for a medium with which the fluid is to interact and an axial outlet port for the medium after it has interacted with the fluid.

5. Apparatus according to claim 4 including a sump for collection of said fluid after it has interacted with said medium and further including means for removing collected fluid from said sump.

6. Apparatus according to claim 5 wherein said means for removing the collected fluid from the sump is a pump arranged to circulate the fluid to the nozzles in the required manner such that the irregular variations in the conditions of flow of the fluid occur.

7. Apparatus according to claim 4 including a plurality of vortex chambers each having a pair of opposed nozzles mounted axially therein and arranged sequentially so that an outlet port of one vortex chamber communicates with an inlet port of a succeeding vortex chamber.

8. An apparatus according to claim 7 including means for enabling a gas treatment liquid to be passed sequentially through said plurality of vortex chambers countercurrent to the flow through said plurality of vortex chambers of a gaseous medium to be treated in said apparatus.

9. Apparatus according to claim 4 including means for vaporizing a liquid medium and supplying the vaporized medium to said vortex chamber thereby to cause the apparatus to function as a distillation apparatus.

10. An apparatus according to claim 1 wherein said nozzles are annular in cross section and co-axial.

11. An apparatus according to claim 1 including a second pair of nozzles positioned in parallel with said first mentioned pair of nozzles and means for supplying all of said nozzles with liquid from a common supply.

* * * * *